Figure 3:
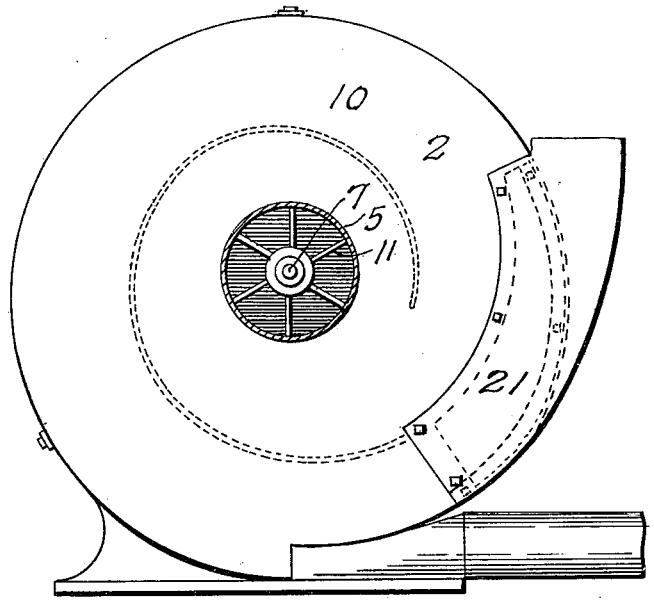

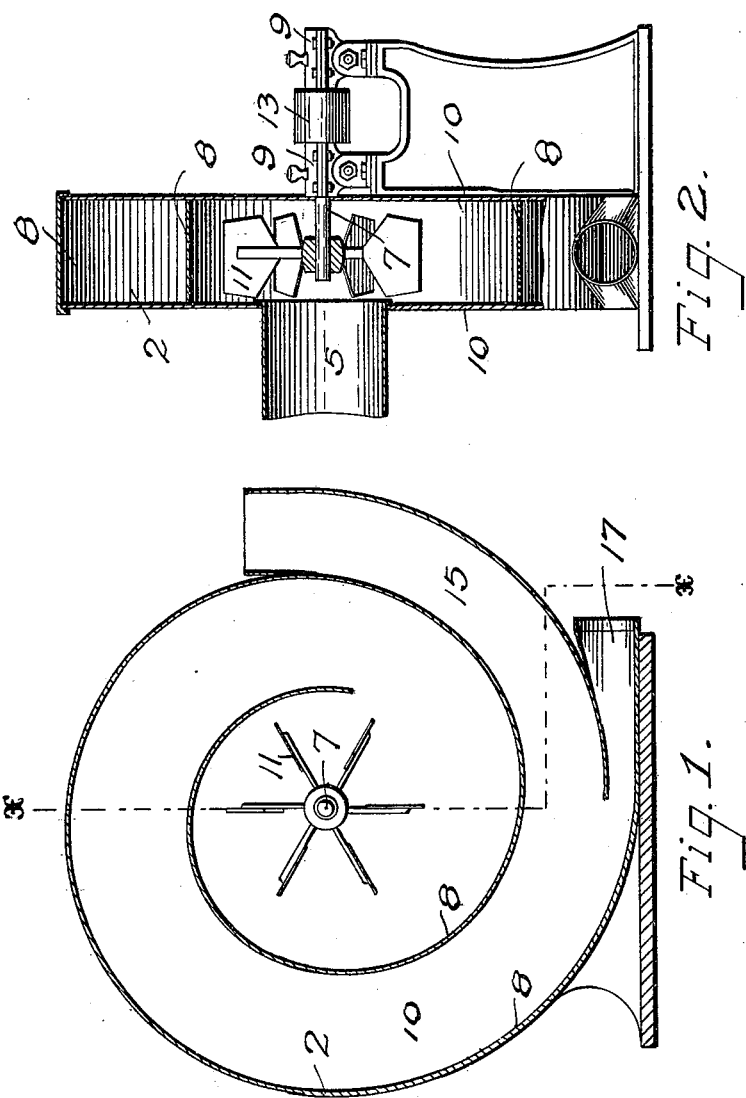

No. 627,575. Patented June 27, 1899.
H. L. DAY.
SEPARATOR.
(Application filed Aug. 31, 1896.)
(No Model.) 3 Sheets—Sheet 2.

Witnesses
Richard Paul.
M. E. Gooley

Inventor
Henry L. Day
By Paul & Hawley
his attorneys

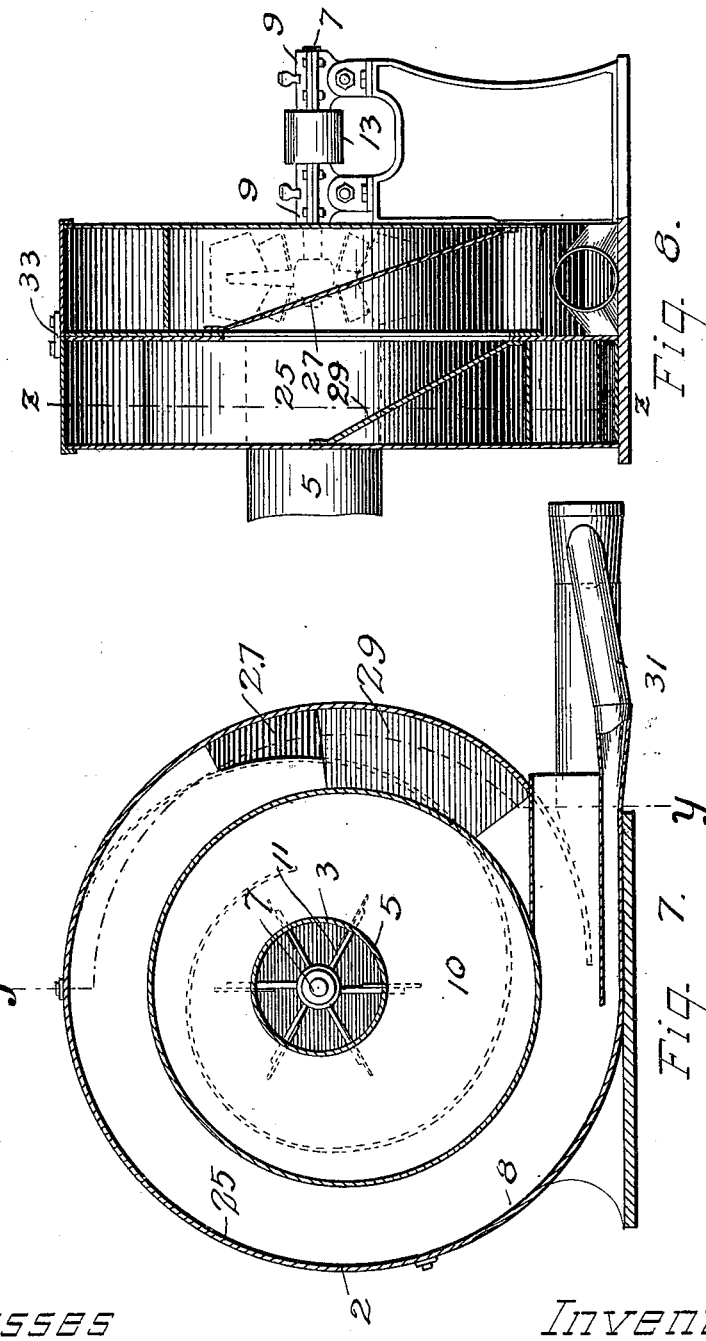

UNITED STATES PATENT OFFICE.

HENRY L. DAY, OF MINNEAPOLIS, MINNESOTA.

SEPARATOR.

SPECIFICATION forming part of Letters Patent No. 627,575, dated June 27, 1899.

Application filed August 31, 1896. Serial No. 604,345. (No model.)

*To all whom it may concern:*

Be it known that I, HENRY L. DAY, of Minneapolis, Hennepin county, Minnesota, have invented certain new and useful Improvements in Separators, of which the following is a specification.

This invention relates to improvements in devices designed for use in woodworking establishments in connection with suitable piping, by means of which shavings and sawdust are drawn away from the wookworking-machines by an air-current and are separated from the air-current and discharged into a suitable shavings-room or into a fuel-feeder that conducts them directly to a furnace, while the air-current, freed from the dust and shavings, is permitted to escape. The device may also be used in connection with flour-mill or grain-cleaning machinery or in any place where it is desirable to separate dust from currents of air or any solid particles from gaseous currents in which they are held in suspension. The device may also be employed in connection with suitable mechanism for feeding shavings, powdered coal, or other fine fuel to furnaces.

The device consists generally in a convolute or flat spiral chamber or passage closed at its sides and provided with an inlet pipe or conductor at its inner or central portion, with a fan located in or at the central portion of said spiral chamber, whereby a current of dust-laden air may be by said fan drawn into the central portion of said chamber and driven along in said spiral passage, the centrifugal action throwing the dust against the outer spiral wall of the passage over which said dust travels, with means for intercepting the dust and directing it out of said passage and means for the escape of the purified air.

It has been customary to provide means for use in flour-mills, elevators, and woodworking establishments for collecting the shavings, dust, or light material by first picking it up in a current of air and then separating it from such current of air. This has generally required a fan for creating the air-current and dust collector or separator into which the air-current was forced by the fan and in which the dust or fine material was separated from the air-current. In Letters Patent No. 513,090, issued to me on the 23d day of January, 1894, I have shown and described a dust-separator for this purpose, and in an application for patent, Serial No. 496,621, filed January 12, 1894, I have shown and described another form of dust-separator.

My present invention is an improvement on the separator shown in my said application for patent, Serial No. 496,621, and enables me to dispense with the separator-fan and fan-casing by providing a fan in the spiral separator which serves to create the air-current, so that the air-current, which picks up the dust or light material, is created and the dust or light material is separated therefrom all in the same machine.

The invention will be more readily understood by reference to the accompanying drawings, forming part of this specification, and in which—

Figures 4, 5, 6:
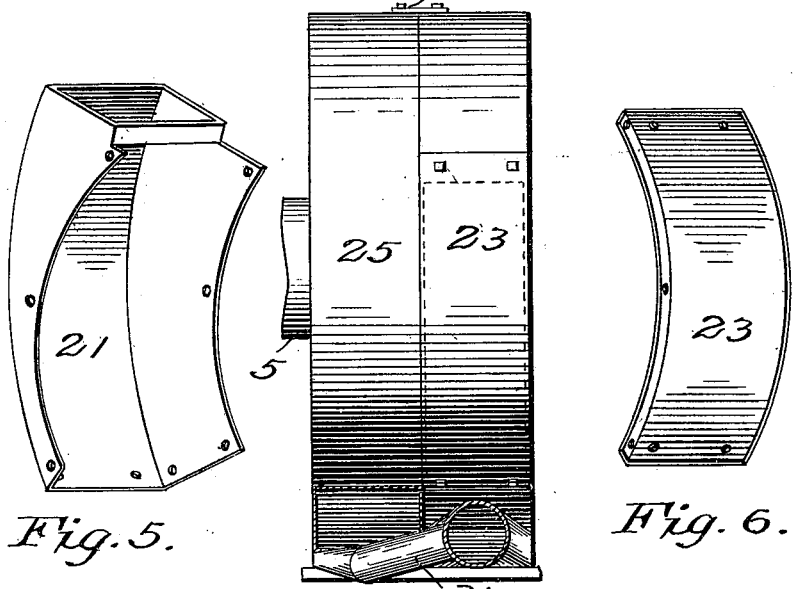

Figure 1 is a vertical transverse section of a separator embodying my invention. Fig. 2 is a longitudinal section thereof on the line *x x* of Fig. 1. Fig. 3 is a side view of a similar machine constructed to permit the addition or attachment of an auxiliary separator duct or part. Fig. 4 illustrates the fan with the auxiliary duct or part attached. Figs. 5 and 6 are respectively detail views of the detachable part shown in Fig. 3 and the attachment to take the place thereof, as shown in Fig. 4. Fig. 7 is a transverse section on the line *z z* of Fig. 8. Fig. 8 is a longitudinal section on the line *y y* of Fig. 7.

In the drawings, 2 represents the separator-casing, which is made in the form of a flat spiral and is provided with the open eye or center 3, to which the suction-pipe 5 may be connected. This pipe may extend to any number of machines from which shavings or other material is to be collected, and for this purpose it may be provided with any number of branch pipes connecting therewith.

7 represents a fan-shaft mounted in suitable bearings, as 9, and having secured to it, within the separator-casing, the fan 11. A driving-pulley 13 is preferably arranged on the shaft 7, by means of which power may be applied to drive the fan at the desired speed.

The separator-casing is provided with a continuous spiral peripheral wall 8 and side walls 10, as shown most clearly in Fig. 1, and said wall merges into the wall of a dust-separating duct or passage 17, arranged at the periphery of the spiral separating-chamber, as shown in Fig. 1, while the main passage 15 is preferably continued some distance beyond said duct 17, as shown also in Fig. 1. The passage 15 may be connected to a dust-collector; but I prefer to connect it to a pipe that leads out of the building in which the fan is located. The duct 17 leads to a suitable dust-receptacle.

The operation is as follows: The dust-laden air is drawn into the separator-casing through the central opening by the fan, and by centrifugal motion the dust is driven to the periphery of the casing and passes along over the peripheral wall of the spiral casing and into and out of the duct 17, while the air continues along in the passage 15 and finally is relieved therefrom. For the purpose of securing a more perfect separation of the dust from the air I may provide an auxiliary duct or separator, into which the air passes from the main duct or passage and in which it travels, throwing the remaining dust or light material against the wall of the duct and causing it to pass out through a passage provided therefor. I prefer to make this auxiliary duct or separator so that it can be applied or removed at any time. As here shown, Figs. 4, 7, and 8, the main casing is provided with an opening in its periphery and in its side wall. When the section 21 is applied thereto, Fig. 3, the opening in the side wall is closed and the opening in the periphery is closed, except that the top of this section forms the outlet-opening for the spiral duct surrounding the fan-casing. When the auxiliary opening is to be used, the section 21 is removed, and the peripheral opening is closed by a section 23. (See Fig. 4.) The substantially annular duct 25, which has an opening in its side to coincide with the opening in the side of the main duct, is then put in place surrounding the central tube or suction-pipe 5. The inclined plates 27 and 29 are placed in position (see Fig. 8) to direct the air-current into the auxiliary duct or separator.

The auxiliary separator is provided with the dust duct or outlet 31, which preferably connects with the dust-passage from the main separator.

The auxiliary separator may be secured in position by means of straps 33, that are connected to the peripheries of the two parts of the casing, or by other suitable means. The operation will be the same as when the main separator is used alone, except that the air will pass through the auxiliary separator and any remaining dust will be removed therefrom.

Among the advantages of this device are that it maintains an equal pressure in the pipes at all times, and as there is no change in the direction of travel of the air there can consequently be no back pressure on the fan.

The device where used in woodworking establishments, flour-mills, or elevators does away with the employment of separate dust-separators, as the air-current is created and the dust separated therefrom by the one device. This is a great advantage, as it enables me to greatly simplify the construction of a dust collecting and separating apparatus, and thereby to greatly lessen the cost thereof.

The device is also made more efficient than the ordinary dust-separator, with a fan located at a considerable distance therefrom and blowing the current of dust-laden air into such separator.

If the casing were placed in a horizontal position—that is, with the fan-shaft vertical—which it may as well be so far as the operation is concerned, the walls 10 10, which I have spoken of as the "side" walls, would then be designated as the "top" and "bottom" walls. I may employ any suitable means in the duct or passage for directing the separated dust therefrom—such, for instance, as deflectors or skimmers, such as are shown and described in my said application, Serial No. 496,621.

I claim as my invention—

1. A separator, consisting of a spiral or convolute duct or passage, provided with a peripheral discharge for the separated solid particles, with a peripheral opening at its outer end for the escape of the purified air or gaseous current, an inlet-conductor connecting with the inner or central end of said duct or passage, and a fan located in said duct or passage at the inner or central end thereof.

2. A separator consisting of a spiral or convolute duct or passage having a continuous-surfaced spiral wall or partition, provided with a peripheral discharge for the separated solid particles, with a peripheral opening at its outer end for the escape of the purified gaseous current, an inlet-conductor connecting with the inner or central end of said duct or passage, and a fan located in said duct or passage at the inner or central end thereof.

3. A separator consisting of a spiral or convolute duct or passage, provided with a peripheral discharge for the separated solid particles, an inlet connecting with the inner or central end of said duct, a fan located in said duct or passage at the inner or central end thereof, and an auxiliary duct or passage connected to the first-named duct or passage and receiving the air-current therefrom, and provided with a peripheral discharge for the separated solid particles and an outlet for the purified gaseous current.

4. A separator, consisting of a spiral or convolute duct or passage, provided with a peripheral discharge for the separated solid particles, an inlet-conductor, a fan located in the inner or central end of said duct or passage, and a removable auxiliary duct or passage connected to said main duct or passage and receiving the air-current therefrom, and provided with means for the discharge of the separated solid particles and with a peripheral outlet for the purified air or gaseous current.

In testimony whereof I have hereunto set my hand this 24th day of July, A. D. 1896.

HENRY L. DAY.

In presence of—
RICHARD PAUL,
A. C. PAUL.